June 19, 1956     NILS-OLOF JOHANNESSON     2,751,578
FAULT INDICATOR FOR PLURAL CONNECTED DEVICES
Filed Feb. 4, 1953     7 Sheets-Sheet 1

INVENTOR
NILS-OLOF JOHANNESSON
BY
*Leach & Radue*
ATTORNEYS

INVENTOR
NILS-OLOF JOHANNESSON
BY
ATTORNEYS

June 19, 1956    NILS-OLOF JOHANNESSON    2,751,578
FAULT INDICATOR FOR PLURAL CONNECTED DEVICES
Filed Feb. 4, 1953    7 Sheets-Sheet 6

INVENTOR
NILS-OLOF JOHANNESSON
BY
*Leech r Radue*
ATTORNEYS

Fig. 25

United States Patent Office 2,751,578
Patented June 19, 1956

2,751,578
FAULT INDICATOR FOR PLURAL CONNECTED DEVICES

Nils-Olof Johannesson, Hagersten, Sweden, assignor to Telefonaktiebolaget L M Ericsson, Stockholm, Sweden, a company of Sweden Application February 4, 1953, Serial No. 335,132

1 Claim. (Cl. 340—253)

This invention relates to common alarm giving means for signalling faults within a group of electrical devices, particularly equipments for long distance telephony.

In modern installations for long distance telephony it is desirable to work with a minimum of periodical checkings and maintenance at the same time as faults within the different equipment must be rapidly detected and repaired. Electromechanical relays have previously been employed for supervision in such installations and these relays have been connected to anode circuits of tubes important for the operation, to carrier frequency voltage sources etc. A complete supervision in this manner gives, however, rise to several troubles, partly owing to the great number of relays needed, and partly owning to the fact that high frequency energy is consumed by relays requiring a comparatively great amount of energy. The purpose of this invention is to construct devices giving the possibilities of a more complete supervision with less complicated devices and a smaller power consumption at the controlled place.

The invention is based upon the principle, that every supervised device acts upon the alternating current impedance of a control apparatus, which is connected to a control wire. The control wire is in its turn connected to an indicating equipment, which can measure and signal a change of the impedance caused by abnormal operation of the device, to which the control apparatus is connected. The control apparatus is arranged in such a manner, that such abnormal operation causes a change of impedance many times greater than that caused by normal variations in the operating conditions. A great number of control means from different supervised devices may be connected to one and the same control wire, whereby the alarm equipment is simplified. In order to determine from which of the controlled devices connected to one and the same control wire that the alarm comes, a special measuring switch is included in the apparatus according to the invention, which switch may be operated manually or automatically.

By making the indicating equipment sensitive to changes in the alternating current impedance two advantages will be obtained: A galvanic contact between the control wire and the controlled devices is thus unnecessary, and the measurements can be performed by means of small voltages and powers, which later may be easily amplified.

The apparatus according to the invention for indicating abnormal operation of one or more devices within a group of such devices comprises an indicating equipment responsive to changes in the impedance between control wires, to which control means individual for each device within said group are connected, whereby during normal operation the impedance of each of said control means is arranged to vary continuously in response to the current or voltage condition within the corresponding device. Said apparatus is mainly characterized by the fact that the impedance alteration of each control means is extremely great when the current or voltage condition within the corresponding device exceeds the limits fixed for its maximum deviations during normal operation, and that the impedance alteration of any control means upon abnormal operation of the corresponding device is appreciably greater than the composite impedance variation resulting from other control means assigned to devices, which are operating within said limits.

As all the control means are connected in exactly the same manner to the control wires and the indicating equipment, the change of the impedance caused by abnormal operation ought to manifest itself either as short-circuit or as interruption, the indicating equipment being suitably arranged for the respective case.

In the first mentioned case all control devices are arranged in shunt to the control wires, whereby abnormal operation of a certain device gives rise to a very low impedance within the corresponding control device.

In the second case all control devices are connected in series with the control wires, whereby abnormal operation of a certain device gives rise to very high impedance within the corresponding control device.

A combination of both above-mentioned cases is also possible, whereby two control wires have one of their ends connected to a constant impedance and the other ends connected to the indicating equipment and the control devices are connected in series and in parallel with said control wires. The parallel connected control devices will then give a very low impedance and the series connected control devices a very high impedance during abnormal operation of the respective devices.

Further characteristic features of the invention will appear from the following description in connection with the accompanying drawing, wherein a number of embodiments and details of the apparatus according to the invention are shown.

Figure 1:
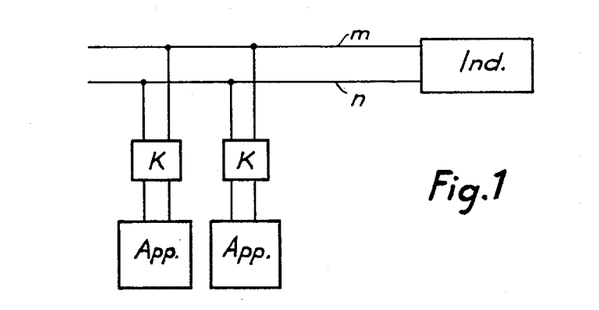
Fig. 1 in the drawing shows a block diagram of an apparatus according to the invention.

In Fig. 1 the main principles of an apparatus according to the invention are illustrated. A number of devices App are to be supervised in common by means of an indicating equipment Ind and they are connected via an individual control device K to common control wires $m$ and $n$ leading to the indicating equipment. The different control devices K are here connected in parallel with the control wires $m$ and $n$, and each may be constructed in accordance with the showing in any appropriate subsequent figures of the drawings.

Figure 2:
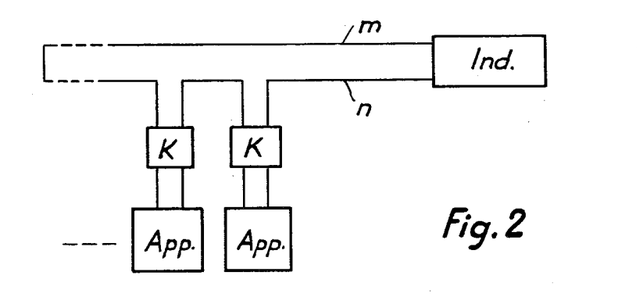
Fig. 2 shows a block diagram of another embodiment of said apparatus.

In Fig. 2 there is shown another embodiment wherein the devices App and their control devices K are connected in series with the control wires $m$ and $n$, which latter in this case are connected together at the far end as seen from the indicating equipment Ind.

Figure 3:
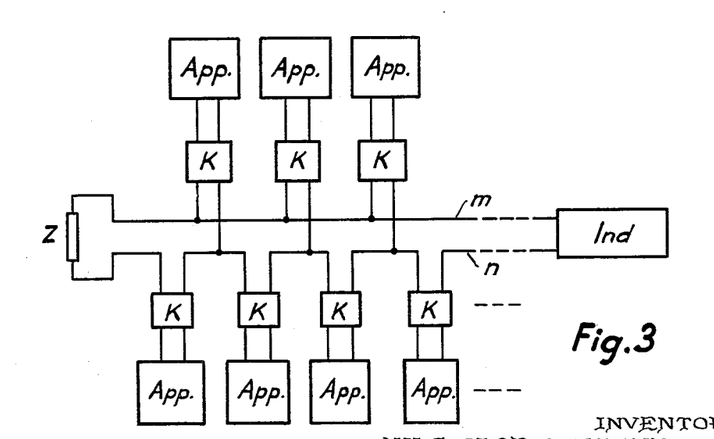
Fig. 3 shows a block diagram of a combination of the devices shown in Figs. 1 and 2.

Fig. 3 shows diagrammatically a combination of the two methods represented in Figs. 1 and 2 for the connection of the supervised devices to the control wires $m$ and $n$. In this case the control wires are terminated by a constant impedance Z at the far end as seen from the indicating equipment Ind. Between the two ends of the control wires control means K associated with the different devices App are connected alternatively in parallel and in series.

As indicated above abnormal operation of any of the devices App will give rise to a very low impedance in parallel connected control means K and a very high impedance in series connected control means. The abnormal operation will evidently correspond to short-circuit and interruption, respectively.

The control means K used in the general systems of Figs. 1 to 3, inclusive may be constructed in different manners. A possibility for supervising a current is thus to use an indirectly heated thermosensitive resistance (thermistor). Such a thermistor consists of a small, very temperature sensitive, resistive element, which is heated by a heater spiral. The current, which is to be supervised, is caused to flow through the heater. When the value of the current differs from the normal value the resistance of said element is changed either to a very high or to a very low value, dependent upon if the current has decreased or increased, and upon the sign of the temperature coefficient of the thermistor.

Figure 4:
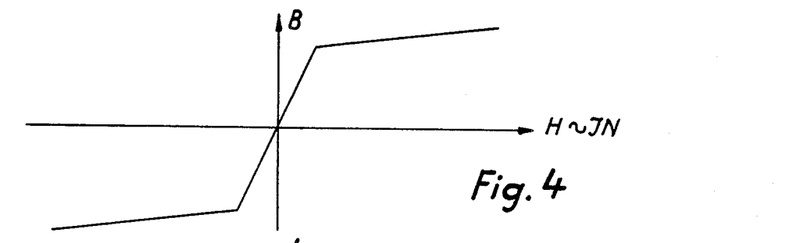
Fig. 4 illustrates a B–H-curve of an iron core.
Figure 5:
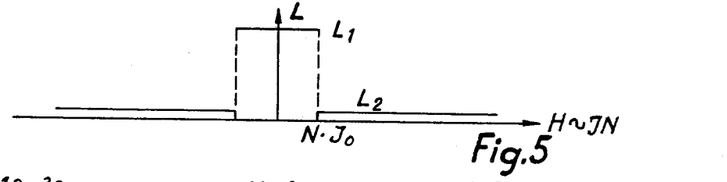
Fig. 5 illustrates the inductance of a coil as a function of its number of ampere turns.

The control means K may also consist of magnetically saturated iron cores. Magnetic materials are now available which have a very steep passage from a magnetically saturated to a magnetically non-saturated condition. The curve of the induction B as a function of the field strength H for such a material is shown in Fig. 4. If a coil is wound on such an iron core, the inductance of the coil as a function of the current I will be approximately as indicated in Fig. 5, wherein the inductance L is shown as a function of the magnetical field strength $H \sim IN$. It is clear from Fig. 5 that $L=L_1$ if $|I|<I_0$ while $L=L_2$ for $|I|>I_0$, $L_1$ being much greater than $L_2$, $I_0$ is a constant dependent upon the core and the number of winding turns N.

Figures 6, 7, 8, 9, 10:
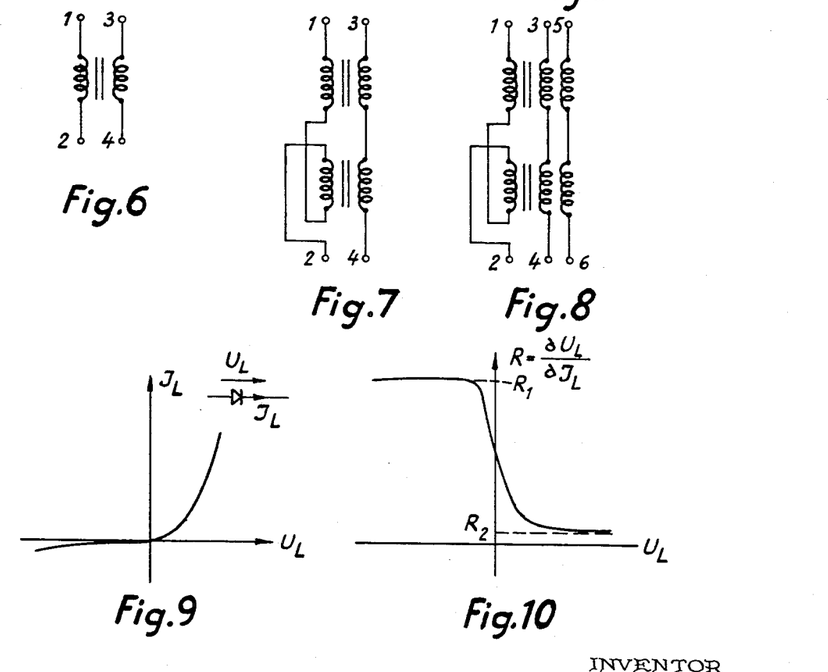
Figs. 6 to 8 show diagrammatically the windings of some coils.
Fig. 9 shows the current-voltage characteristic of a crystal diode.
Fig. 10 shows the differential resistance of a crystal diode as a function of the bias of said diode.

The indicated properties of such a coil may be utilized for control devices K in an apparatus according to the invention. For this purpose a core having the mentioned properties is provided with two windings 1—2, 3—4 as shown in Fig. 6. The winding 1—2 is via the control wire connected to the indicating equipment Ind (Fig. 1–3), while the winding 3—4 is passed by a direct current $I_{34}$ which is to be supervised. When $|I_{34}|>I_0$, the alternating current impedance $Z_{12}$ of winding 1—2 will be very small, and if $|I_{34}|<I_0$, $Z_{12}$ will be very high. Dependent upon if $|I|>I_0$ or $|I|<I_0$ corresponds to abnormal operation the different control devices are thus connected in series (Fig. 2) or in shunt (Fig. 1) with the control wire $m, n$.

The circuit shown in Fig. 6 has some disadvantages. A certain crosstalk may thus be obtained between the different controlled devices because of alternating voltages being transformed from winding 1—2 to winding 3—4, and the direct current $I_{34}$ has moreover to be applied to winding 3—4 from a circuit having a very high alternating current resistance. These disadvantages may be eliminated by means of a circuit according to Fig. 7, in which circuit two iron cores are utilized. The two terminals 1 and 2 are connected via the control wire to the indicating equipment Ind and the two terminals 3 and 4 are connected to the supervised direct current in the same manner as described above. The two coils are identically equal, but the windings are connected in such a manner, that an alternating current through 1—2 will give alternating voltages across winding 3—4, which are of opposite directions and thus neutralize each other. The function of the device shown in Fig. 7 is for the rest the same as that of the device shown in Fig. 6.

By adding other windings 5, 6 as shown in Fig. 8 through which windings a constant direct current is passed counteracting the direct current $I_{34}$ it is possible to get an indication when the current $I_{34}$ is somewhat greater than its normal value as well as when it is somewhat less than said normal value. The limits will then depend upon the magnetical properties of the cores, the number of turns of the windings and the value of the current $I_{56}$. Abnormal operation will here evidently cause a low impedance between the output terminals 1—2.

Another manner of arranging a control device K is to utilize the non-linear properties of rectifiers. The current-voltage characteristic of e. g. a crystal diode is illustrated in Fig. 9. The differential resistance R for small alternating voltages varies thereby with different biases $U_L$ in the manner shown in Fig. 10.

If the voltage $U_L$ varies from some volts minus to some volts plus, said resistance R will be changed from a high limit value $R_1$ to a low limit value $R_2$. The ratio $R_1/R_2$ is usually very high, often about $10^2$ or $10^3$ and a change of only some tenths of a volt around the value $U_L=0$ will give such a great change of R, that it may be considered either as a short-circuit or an interruption of the rectifier. The above statements are also true for other kinds of rectifiers, as rectifier tubes with hot cathode, copper-oxide and selenium rectifiers.

The mentioned properties of rectifiers may be utilized for the construction of a control device K, which is sensitive for changes of a direct voltage. The abnormal operation may thereby correspond to an interruption, $R \rightarrow R_1$, or short-circuit, $R \rightarrow R_2$. The latter case will, however, give a simpler construction, for which reason only circuits in accordance herewith will be described in the following.

The control devices K are thus connected in parallel with the control wire to the indicating device, which device therefore only gives alarm for short circuit.

The direct voltage U, which is to be supervised in a certain control device, is compared with a fix bias voltage $E_0$. The difference voltage $(E_0-U)$ is caused to actuate a rectifier, which as seen from the alternating current point of view is connected in parallel with the control wire. A simple embodiment of such a control device is shown in Fig. 11.

The condensers $C_1$, $C_2$ and $C_3$ have a low impedance at the measuring frequency. The resistor $R_x$ in the circuit shown in Fig. 11 has a rather high value. In this case U is normally greater than $E_0$, the rectifier L is non-conducting and the impedance $Z_{in}$ between the terminals 1 and 2 connected to the control wires is high and equal to $R_x$. If the voltage U across the terminals 3 and 4 connected to the supervised device decreases with a certain amount below its normal value, so that $U \leq E_0$, the rectifier L becomes conducting, the input impedance $Z_{in}$ will be low and the indicating equipment Ind will give alarm.

If, instead, alarm is wanted, when the voltage U of the supervised device has increased with a certain amount above its nominal value, the polarity of the rectifier L is reversed and the voltage $E_0$ is increased to a corresponding degree. If it is wanted to give alarm for both positive and negative deviations two branches with different biases and rectifiers with reversed polarities in comparison with each other, will be utilized according to Fig. 12.

Figure 11:
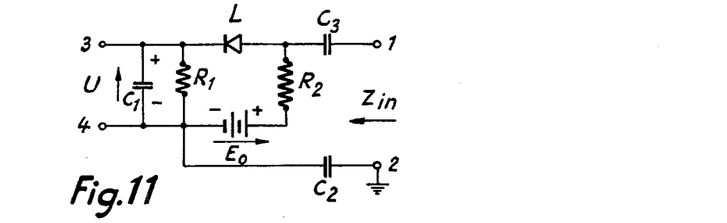
Figs. 11 to 17 illustrate different embodiments of the control means associated with devices supervised by the apparatus according to the invention.
Figure 12:
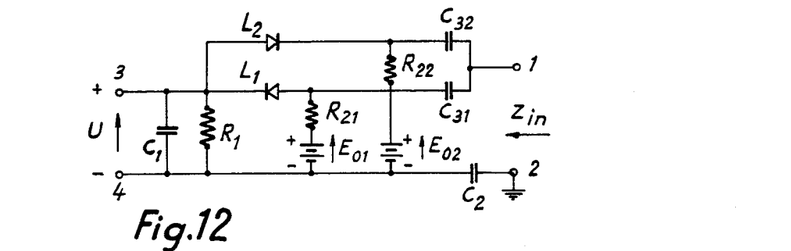

In the circuits shown in Figs. 11 and 12 the condenser $C_1$ may be omitted if the alternating current impedance of $R_1$ is low enough.

Figure 13:
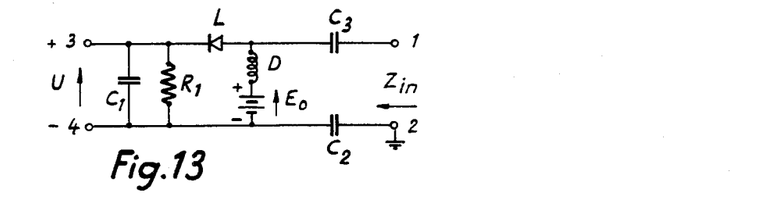

The resistors $R_2$ and $R_{21}$, $R_{22}$, respectively, are determined by two contradictory conditions; thus they must not have too small a resistance so that the control wire is loaded too much, and further they must not have too high a resistance, so that the direct current through the rectifiers is limited to too small a value. These difficulties may be avoided by using coils, which have a low direct current impedance and a high alternating current impedance. Fig. 13 shows such a coil D inserted instead of the resistor $R_2$ in Fig. 11.

Figure 14:
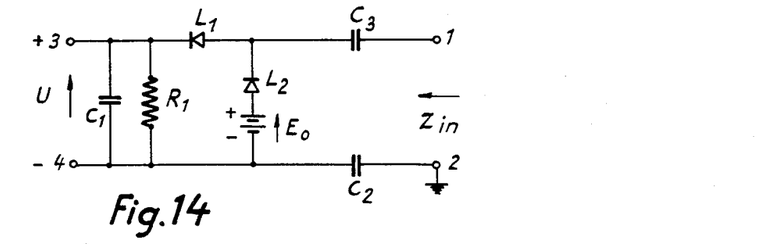

Another method is to insert an additional rectifier as is shown in the circuit of Fig. 14. During normal operation U is greater than $E_0$ and the two rectifiers $L_1$ and $L_2$ are non-conducting, i. e. $Z_{in}$ is high. When $U \leq E_0$, $L_1$ and $L_2$ will begin to conduct, i. e. $Z_{in}$ will be low and alarm is obtained.

The circuit diagrams in Figs. 13 and 14 relate to devices giving alarm for too low voltages. In a similar manner alarm may be obtained for too high voltages by reversing the polarity of the rectifiers in Figs. 11 and 12 and increasing the bias $E_0$ to the upper alarm limit.

Figure 15:
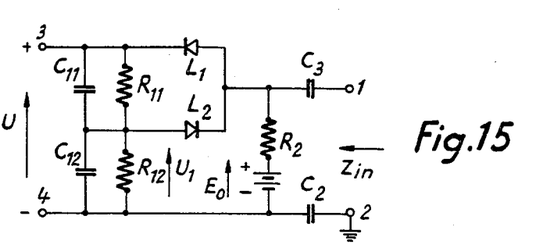
Figure 16:
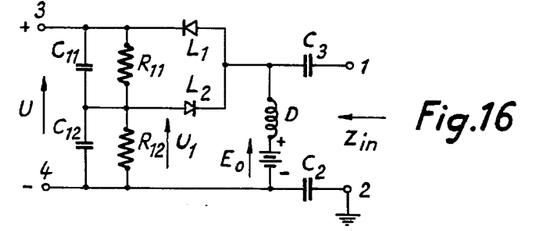
Figure 17:
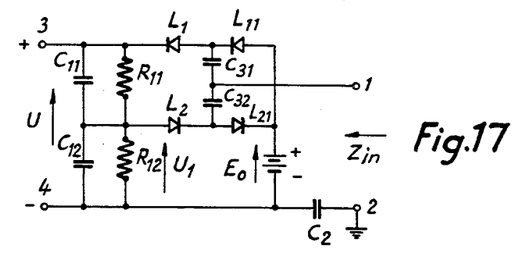

In order to obtain alarm for both too high and too low voltages the resistors $R_{21}$, $R_{22}$ in Fig. 12 may also be replaced by coils or rectifiers. A further way is to use only one bias $E_0$, but inserting a voltage divider for the voltage U, which is to be supervised. Figs. 15 to 17 show this principle whereby the bias $E_0$ is applied in series with the resistor $R_2$, the coil D and the rectifiers $L_{11}$, $L_{21}$, respectively.

In these cases the voltage divider $R_{11}$, $R_{12}$ and the bias $E_0$ are adjusted so that in normal cases $$U > E_0$$

$$U_1 = \frac{R_{12}}{R_{11}+R_{12}} \cdot U < E_0$$

Alarm will then be obtained, if (1) $\qquad U \leq E_0$ (2) $\qquad U \geq \frac{R_{11}+R_{12}}{R_{12}} \cdot E_0$ i. e. alarm will be obtained for both too high and too low voltages.

In the circuit diagrams according to Figs. 15 to 17 the condensers $C_{11}$, $C_{12}$, $C_2$, $C_3$, $C_{31}$ and $C_{32}$ ought to have a low impedance for the measuring alternating voltage. The condensers $C_{11}$ and $C_{12}$ may be omitted, if the alternating current impedances of $R_{11}$ and $R_{12}$ are low enough.

For a certain type of rectifiers the bias difference $\Delta U$ between practically interrupter and practically short-circuiter impedance will be constant. By having the normal value $U_0$ of the voltage U different in different devices and the value of $E_0$ in each individual case equal to $(U_0+\Delta U)$ or $(U_0-\Delta U)$, it is possible to obtain alarm for different percentages of deviations of the devices. The cathode voltage of a tube need e. g. only be controlled with regard to its lower limit with a fairly great tolerance, while on the other hand a direct voltage, detected from a pilot frequency in a carrier frequency system has to be supervised with considerably narrower limits in both directions.

In the figures one of the control wires has been shown grounded, which is advantageous in practical constructions. The condensers $C_2$, $C_3$, ($C_{31}$, $C_{32}$) serve to galvanically separate the two points from ground between which the direct voltage is to be supervised.

It is clear from the foregoing that one and the same indicating device may be used for supervising direct voltages with different potentials in relation to ground, negative and/or positive deviations, and with different tolerances for different devices.

If there is a group of direct voltages with e. g. one of their poles at a common potential, the condenser $C_2$ in Figs. 11 to 17 ought of course to be common for this group. If further the voltage $E_0$ is equal for the whole group the condensers $C_3$ respectively $C_{31}$, $C_{32}$ may be omitted and the bias $E_0$ may be applied in common through a resistor, coil or rectifier. If in this case one pole of the direct voltages is grounded, the condensers $C_2$ may of course be omitted.

Figure 18:
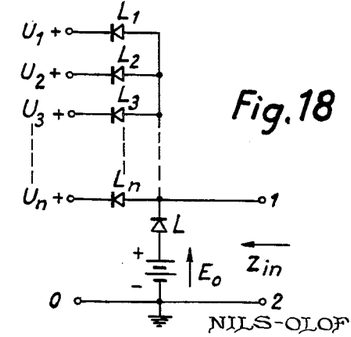
Figs. 18 and 19 show other embodiments of control means belonging to the apparatus according to the invention.

Fig. 18 shows an example of such a device, wherein one pole is grounded, which device gives alarm for too low voltages, and wherein the bias $E_0$ is applied via a rectifier. In this case alarm will evidently be obtained, if any voltage U is less than $E_0$. The terminals 1—2 are connected to the control wire in the same manner as described above.

Figure 19:
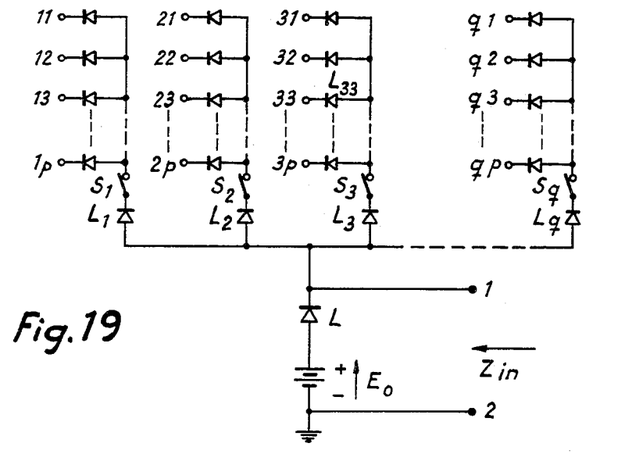

The back resistances of the rectifiers are however in fact not infinitely great and their forward resistance is not infinitely small. This will limit the number of control devices, which may be connected in shunt with the same pilot wire. The number of devices can be increased considerably, if the circuit shown in Fig. 18 is utilized and the rectifiers are arranged in groups as is shown in Fig. 19.

In normal cases the voltages of the points 11, 12 etc. are always greater than $E_0$ and all the rectifiers are non-conducting, i. e. only a very small current is flowing. The impedance $Z_{in}$ will then be equal to the back resistance of L, shunted by an impedance, which cannot be less than the parallel connected back resistances of the rectifiers $L_1$, $L_2$ ... $L_q$. In this manner the number of parallel-connected rectifiers is limited to $(q+1)$ in the normal case instead of $q.p$ as it would otherwise have been. If now the voltage is supposed to decrease below its allowed value $E_0$ at some point, e. g. at point 33, a rather great current will pass through the rectifier $L_{33}$, $L_3$ and L, causing their alternating current impedance to be low so that indication will be obtained.

After the indication of a fault the question of where this fault is located may be examined in a great many manners. At first it may be proved e. g. in which group the fault is located by disconnecting respective switches $S_1$, $S_2$ ... $S_q$ shown in Fig. 19, and it may then by means of a separate instrument be examined at which point the direct voltage is too low.

The number of groups and their further division must of course be adapted to the wanted number of measuring points and the characteristics of the rectifiers and the division into groups becomes thus more complete for a larger installation.

Fig. 19 shows a circuit intended to give alarm for too low a voltage. It is possible to obtain alarm for too high a voltage in the same manner, if the rectifiers are reversed. The rectifier L may also be replaced by a coil which has a low direct current impedance and a high alternating current impedance.

The devices which are supervised by the control means K constructed according to any of the embodiments described above, may be more or less sensitive to the alternating current, which is used for the impedance measurement. The interferences caused thereby may however be easily eliminated by decoupling by means of resistors, condensers and inductances in the control device, the pair of terminals, which is connected to the supervised device. Such a decoupling will also prevent crosstalk between the supervised devices.

The indicating equipment of the apparatus according to the invention may be constructed in different manners. Some possible embodiments of such indicating equipments will be described in the following.

Figure 20:
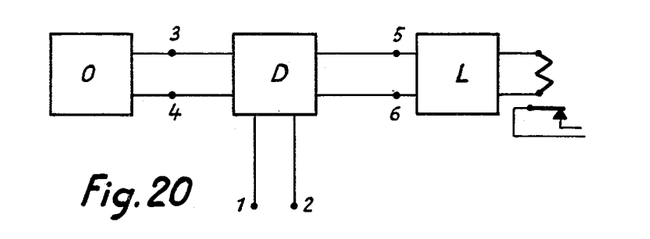
Figs. 20 to 25 show different embodiments of the indicating means of an apparatus according to the invention.

In the indicating equipment according to Fig. 20 the designation O indicates an oscillator, which continuously delivers an alternating voltage, and L indicates alarm means giving fault indications. The oscillator O is connected to the alarm means L through an attenuator D. The control wire is connected to the pair of terminals 1—2 of the attenuator D. The attenuator is constructed in such a manner that the great change in the impedance of the control wire arising as a result of a fault gives a very great change in the trasmission properties of the attenuator from the pair of terminals 3—4 to the pair of terminals 5—6.

The device according to Fig. 20 may be constructed in two different manners, so that a fault within a supervised device gives either a low or a high attenuation in the attenuator D. In the first case the alarm means L has to give alarm, when an alternating voltage from the oscillator O is applied to the pair of terminals 5—6, and in the latter case alarm must be given, when the alternating voltage disappears from said pair of terminals. The last mentioned arrangement gives better control, because in this case also a fault in the oscillator O or the alarm device L causes alarm.

The attenuator D may in the most uncomplicated case be non frequency dependent. It is, however, in certain cases advantageous to have a change in the impedance between the terminals 1—2 to influence the transmission properties within a limited range of frequencies only. A selective alarm device may thus be constructed.

Figure 21:
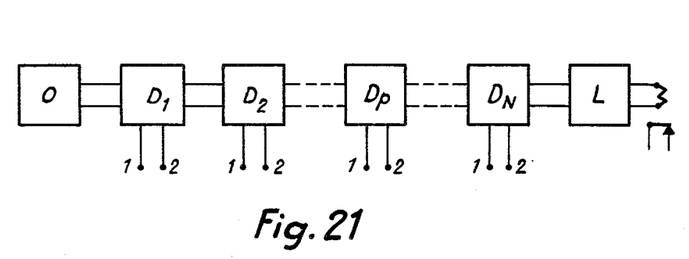

Such a frequency selective alarm device is shown in Fig. 21, wherein $D_1$, $D_2$ . . . $D_N$ indicate a number of series connected attenuators each of them having its control wire connected to respective pairs of terminals 1—2. The $p$th attenuator $D_p$ changes its transmission properties only at the frequency $f_p$, when the control wire connected to $D_p$ changes its impedance as the result of a fault. The attenuation of $D_p$ is moderate for other frequencies. The frequencies $f_1, f_2$ . . . $f_N$ of respective attenuators are all different.

The oscillator O may be constructed so as to simultaneously transmit all the said frequencies. If the attenuators normally have a low attenuation at the respective frequencies $f_1$ . . . $f_N$ the alarm device L has to be constructed so that disappearance of an alternating voltage of a certain frequency will cause alarm. This may be arranged e. g. by the alarm device being provided with selective means with separate alarm transmitters for each frequency $f_1$ . . . $f_N$. Another possibility is to provide the alarm means L with only one alarm transmitter having variable tuning. This tuning is varied periodically as a function of time, so that one by one of the transmitted signals of the frequencies $f_1$ . . . $f_N$ will be received. Each signal will then be received for such a long time that possible disappearance can provoke alarm giving.

Instead of having periodically varying tuning of the alarm means L the oscillator O may be constructed to transmit only one frequency, which is made to obtain one by one of the values $f_1$ . . . $f_N$ periodically. In this case the alarm means is constructed to have equal sensitivity for all the frequencies $f_1$ . . . $f_N$. When a fault causes a high attenuation e. g. in $D_p$ signals to the alarm means L will lack, while the oscillator transmits the frequency $f_p$, and this for a time sufficiently long for alarm.

If on the other hand the attenuators have normally a high attenuation at their respective frequencies $f_1$ . . . $f_N$ a less complicated device is obtained. In such a case the alarm device is constructed to have equal sensitivity for the frequencies $f_1$ . . . $f_N$ and the oscillator is caused to transmit these frequencies either simultaneously or one by one. No signals will now normally reach the alarm means L. As a result of a fault in one of the control devices a low attenuation is obtained in the corresponding attenuator and a signal will reach the alarm means causing operation of last mentioned means.

Which of the attenuators that provokes alarm may be determined by either transmitting from the oscillator O or by receiving in the alarm means L one by one of the frequencies $f_1$ . . . $f_N$.

The circuits described above having series-connected attenuators may e. g. be used for giving different alarms for different kinds of faults at the same place, or they may also be used for supervising unattended repeater stations from an attended station, e. g. in case of a transmission line. In the latter case a special wire may be reserved for the fault indication with oscillator, attenuators and alarm means according to what has been described above. Another possibility is to insert the attenuators $D_1$ . . . $D_N$, the oscillator O and the alarm device L into the transmission line itself with its ordinary line amplifiers F according to Fig. 22.

Figure 22:
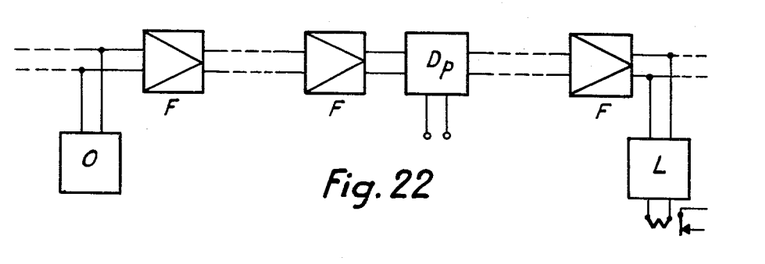

In Fig. 22 the oscillator O and the alarm means L are connected in shunt to the transmission line. Of the attenuators with their control wires only the $p$th is shown. In this case the frequencies $f_1, f_2$ . . . $f_N$ have to be chosen so as not to disturb the ordinary transmission but they should still be transmitted without too large an overall transmission loss. In other respects the oscillator, the alarm means and the attenuators $D_1$ . . . $D_N$ may be arranged according to the above mentioned principles.

In the circuit according to Fig. 22 the attenuators are inserted directly into the transmission line in series with the line amplifiers F. These latter are always provided with a strongly negative feedback because of the stability and intermodulation requirements. The attenuators D may then instead be inserted in series with the normal feedback networks $\beta$ of the line amplifiers F in the manner shown in Fig. 23.

Figure 23:
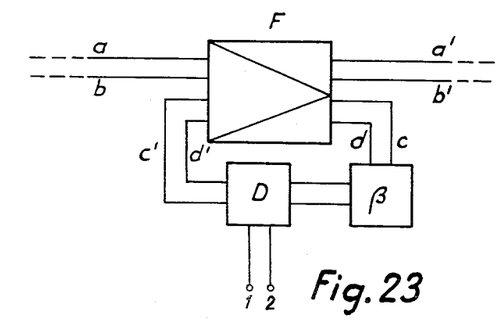

In Fig. 23 $a$, $b$ and $a'$, $b'$ indicate the transmission line wherein the line amplifier F is inserted. The amplifier F gets its feedback voltage via the wires $c$, $d$, $c'$, $d'$, the ordinary feedback network $\beta$ and the attenuator D. In the same manner as before the control wire for faults is connected to the pair of terminals 1—2 of the attenuator D. In this case the attenuator must only comprise positive impedances and shall always have a low attenuation for frequencies differing from its indication frequency $f_1$. If a fault gives the network D a high attenuation for the frequency $f_1$ instead of a normally low attenuation, a corresponding increase of the amplification of the amplifier F at the frequency $f_1$ will be obtained and vice versa. This fact may then be further utilized according to previous principles for indicating alarm. By inserting the attenuator in the feedback path there is obtained the advantage of being free from the rigorous demands of impedance correctness at the ordinary transmission frequencies, which demands each device inserted in a transmission line must fulfil.

In the foregoing description there have only been described circuits for the indicating equipment which have separate oscillator and indicator. It may also be advantageous to combine these into a single amplifier-oscillator if there is only one attenuator network. This case is represented in Fig. 24.

Figure 24:
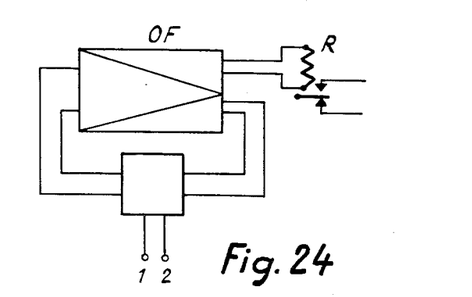

The oscillator OF in Fig. 24 is connected to the attenuation network D in such a manner, that the changes of the attenuation of the network D, which are caused by a fault in a controlled device will either start or stop electrical oscillations of the oscillator OF so as to cause alarm giving. The control wire for the changes of the impedance caused by faults is as before connected to the pair of terminals 1—2 of the attenuating network D. The alarm indicating equipment is in the figure shown as a relay R. The device OF is constructed as an amplifier with branches for both positive and negative feedback, the attenuating network D being inserted in one of these branches. When the positive feedback is predominating the oscillator will oscillate, otherwise not.

The attenuating networks D may be constructed in a great many different manners. In the less complicated cases the impedance $Z_{in}$ of the control wire constitutes the shunt or series branch of an L-section. Another conceivable possibility is to make $Z_{in}$ constitute an impedance of the branch of a bridge. In order to make the attenuators frequency selective the control wire may be connected via an electrical band pass filter. In the simplest case this filter may consist of a single tuned circuit, a piezo-electrical crystal etc.

Figure 25:
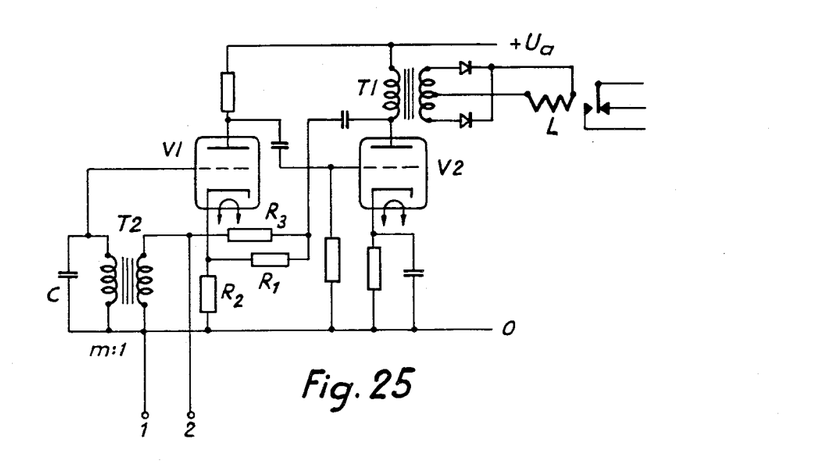

In Fig. 25 there is shown the principal circuit of an oscillator-amplifier device with attenuating networks as parts of a bridge. The electron valves V1 and V2 are included in a conventional amplifier circuit. Through the output transformer TL the valve V2 works upon an alarm circuit L (a relay). The amplifier is given feedback via the attenuating network D, which here is formed by the resistors $R_1$, $R_2$, $R_3$ and the transformer T2. The control wire is connected to the terminals 1—2. The transformer T2 is tuned to a certain frequency by means of the condenser C, the transformation ratio of the transformer being $m:1$. The amplifier is given negative feedback via the bridge branch $R_1$—$R_2$ and positive via $R_3$—

T2. When the value of the impedance, which is connected to the terminals 1—2, exceeds the value $$\frac{R_2 R_3}{m R_1}$$

the positive feedback is greater than the negative, so that the amplifier will oscillate, if its amplification without feedback is high enough.

The apparatus according to the invention has in the foregoing been described in connection with a plurality of different embodiments. It is, however, obvious that other modifications fall within the scope of the invention.

What is claimed is:

Apparatus for indicating abnormal operation of one or more electrical devices within a group of such devices comprising, in combination, indicating equipment having an oscillator, attenuator means, an alarm, said means being connected directly to modify the oscillator output to the alarm, control wires reflecting by variable impedance changes the condition of supervised apparatus, said attenuator means being connected to said control wires and having non-linear transmission properties in response to variations in impedance between control wires, a control means connected to the control wires for each device within the group, the impedance of each control means during normal operation being arranged to be responsive continuously to electrical conditions in the corresponding device, the impedance change of each control means being abnormally great, when conditions within its corresponding device exceed limits fixed for maximum deviations during normal operations, said control means being all connected in series to each other and to said control wires, whereby abnormal operation of any device causes a very high impedance of the corresponding control means.

References Cited in the file of this patent

UNITED STATES PATENTS

| | | |
|---|---|---|
| 1,461,790 | Sultzer | July 17, 1923 |
| 2,249,323 | Mitchell | July 15, 1941 |
| 2,260,160 | Benning et al. | Oct. 21, 1941 |
| 2,315,434 | Leibe | Mar. 30, 1943 |
| 2,460,789 | Thompson | Feb. 1, 1949 |
| 2,509,365 | Parmentier | May 30, 1950 |
| 2,572,292 | Wittenberg | Oct. 23, 1951 |
| 2,574,458 | Atkinson et al. | Nov. 13, 1951 |
| 2,581,056 | Walmsley et al. | Jan. 1, 1952 |
| 2,636,164 | Lubin et al. | Apr. 21, 1953 |